US010431344B2

United States Patent
Parize et al.

(10) Patent No.: US 10,431,344 B2
(45) Date of Patent: Oct. 1, 2019

(54) ASSEMBLY WITH A TUBE LOCKING DEVICE, AND ASSOCIATED MAINTENANCE METHOD

(71) Applicant: AREVA NP, Courbevoie (FR)

(72) Inventors: Christophe Parize, Jambles (FR); Laurent Cahouet, Chaudenay (FR)

(73) Assignee: AREVA NP, Courbevoie (FR)

( * ) Notice: Subject to any disclaimer, the term of this patent is extended or adjusted under 35 U.S.C. 154(b) by 639 days.

(21) Appl. No.: 14/902,680

(22) PCT Filed: Jul. 1, 2014

(86) PCT No.: PCT/EP2014/063982
§ 371 (c)(1),
(2) Date: Feb. 23, 2016

(87) PCT Pub. No.: WO2015/000911
PCT Pub. Date: Jan. 8, 2015

(65) Prior Publication Data
US 2016/0180978 A1    Jun. 23, 2016

(30) Foreign Application Priority Data

Jul. 1, 2013 (FR) ..................... 13 56368

(51) Int. Cl.
*G21C 17/112*      (2006.01)
*G21C 13/067*      (2006.01)
(Continued)

(52) U.S. Cl.
CPC .......... *G21C 17/112* (2013.01); *F16L 3/2235* (2013.01); *F16L 41/001* (2013.01);
(Continued)

(58) Field of Classification Search
CPC ......... F16L 41/001; F16L 3/2235; F16K 7/00; F16K 7/06; G21C 17/112; G21C 17/116; G21C 13/067
See application file for complete search history.

(56) References Cited

U.S. PATENT DOCUMENTS 4,068,692 A * 1/1978 Arya ...................... G21C 21/00
                                                     141/231
4,288,292 A * 9/1981 Hardin, Jr. ................ F16L 3/01
                                                     248/68.1
(Continued)

FOREIGN PATENT DOCUMENTS

DE        197 26 550 A1    2/1999
FR            2883096 B1 *  6/2007    ........... G21C 17/112
(Continued)

OTHER PUBLICATIONS

Search Report for corresponding International Application PCT/EP2014/063982.

*Primary Examiner* — Lily C Garner
(74) *Attorney, Agent, or Firm* — Davidson, Davidson & Kappel, LLC

(57) ABSTRACT

An assembly is provided that includes a device for locking tubes in position relative to one another, with at least a first arm, a locking axle having a plurality of bearing surfaces, the locking axle being movable between a position locking the tubes each between one of said bearing surfaces and the first arm, and a released position, in which the tube segments are free.

14 Claims, 4 Drawing Sheets

(51) Int. Cl.
*G21C 17/116* (2006.01)
*F16L 3/223* (2006.01)
*F16L 41/00* (2006.01)
*G21C 21/00* (2006.01)
*G21C 7/36* (2006.01)

(52) U.S. Cl.
CPC .......... *G21C 13/067* (2013.01); *G21C 17/116* (2013.01); *G21C 21/00* (2013.01); *G21C 7/36* (2013.01); *Y02E 30/40* (2013.01)

(56) References Cited

U.S. PATENT DOCUMENTS

| | | | | |
|---|---|---|---|---|
| 4,833,329 | A | * | 5/1989 | Quint ........................ G21G 4/08 137/573 |
| 4,857,260 | A | * | 8/1989 | Schoenig, Jr. ....... B23K 37/047 376/245 |
| 6,957,798 | B1 | | 10/2005 | Schmidt |
| 7,377,472 | B2 | * | 5/2008 | Brown ....................... F16L 3/10 24/16 R |
| 8,876,068 | B2 | * | 11/2014 | McCoy ...................... F16L 3/02 138/112 |
| 2009/0143723 | A1 | * | 6/2009 | Szpara .................... A61M 1/28 604/29 |
| 2010/0002825 | A1 | * | 1/2010 | Buchot ................. G21C 17/112 376/260 |
| 2010/0266093 | A1 | | 10/2010 | Matsumoto |
| 2015/0232798 | A1 | * | 8/2015 | Zhou ....................... C12M 29/00 435/289.1 |

FOREIGN PATENT DOCUMENTS

| | | | | |
|---|---|---|---|---|
| JP | 09303582 | A | * 11/1997 | .............. F16L 55/10 |
| JP | 2004328935 | A | * 11/2004 | ............ F16L 3/2235 |

* cited by examiner

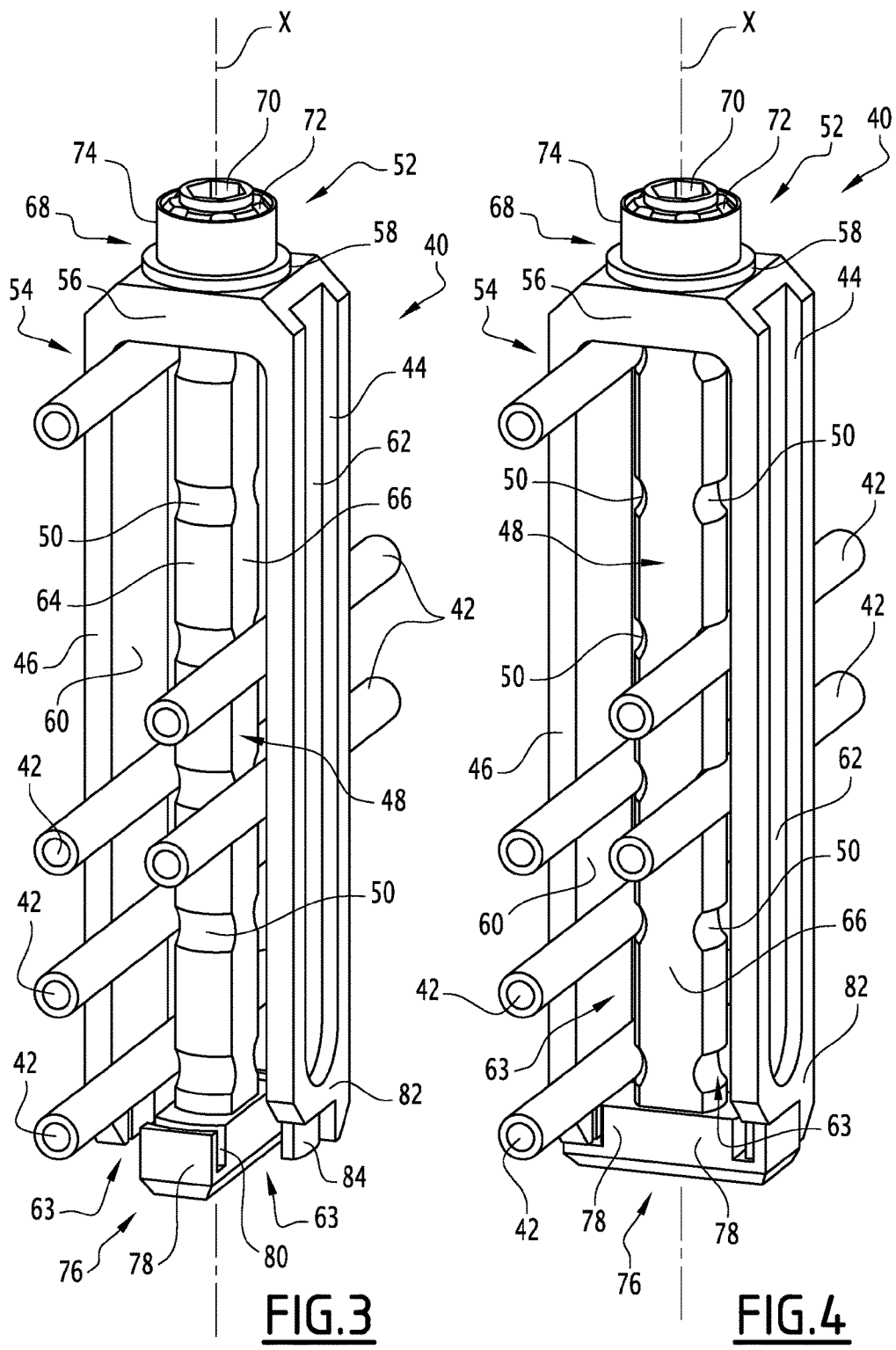

ASSEMBLY WITH A TUBE LOCKING DEVICE, AND ASSOCIATED MAINTENANCE METHOD

The present invention generally relates to locking tubes in position relative to one another, in particular nuclear reactor thermocouple pipes.

More specifically, according to a first aspect, the invention relates to an assembly of the type comprising:
- a plurality of tubes having respective segments substantially parallel to one another;
- a device for locking the tubes in position relative to one another.

Pressurized water nuclear reactors include, inside a vessel, the core of the nuclear reactor made up of prismatic fuel assemblies with their vertical axis and, above the core, upper inner equipment in particular including a set of vertical guide-tubes making it possible to guide control bars made up of bundles of rods placed parallel to one another and containing a material absorbing neutrons.

To control reactors by adjusting the reactivity of the core, the absorbent rod clusters are moved vertically, during the operation of the reactor, such that the absorbent rods are introduced over a greater or lesser height within some fuel assemblies of the core.

The upper inner equipment generally includes an upper plate, also called support plate, and a lower plate, making up the upper plate of the core of the nuclear reactor bearing on the upper end of the fuel assemblies, when the inner upper equipment is in the usage position in the core of the reactor. The vertical guide tubes guiding the control rods are connected to the support plate and the lower plate, which each include a first part intercalated between the support plate and the lower plate and a second part fixed above said support plate. Spacer columns positioned between the support plate and the lower plate, parallel to the guide tubes, make it possible to maintain these plates and ensure the rigidity of the upper inner equipment.

The upper inner equipment also comprises instrumentation columns, such as cylindrical thermocouple columns. In each of the thermocouple columns, a thermocouple assembly is positioned making it possible to measure the temperature of the coolant at the outlet of a preselected set of fuel assemblies of the core of the reactor.

There are generally two or four thermocouple columns.

Each thermocouple column is not fixed on the support plate of the upper inner equipment, but is guided by a spindle extending vertically above this plate and which penetrates the thermocouple column. However, each thermocouple column is secured to the cover of the vessel of the reactor only by upper sealing means, positioned between a tubing of an adapter fixed in an opening of the cover and the upper part of the column.

Several thermocouples are therefore positioned in the column and leave that column through peripheral openings, arranged at the base of the column so as each to join a branch passing through the support plate. To that end, each branch is provided with a guide tube positioned aligned with an orifice arranged in the support plate substantially overhanging a zone where the temperature measurement must be done. The thermocouple is inserted into an upper guide pipe supported by the thermocouple column and by a lower guide pipe positioned in the tube of the corresponding branch. The sensitive measuring end of the thermocouple is positioned at the predetermined measuring zone.

BACKGROUND

Some of the thermocouples are intended to measure the temperature of the coolant of the reactor, at the outlet of the core, below the upper plate of the core, near the upper end-piece of the fuel assemblies.

The thermocouples inserted into the pipes are subjected to high temperature and pressure stresses, such that some of them may have operating defects after a certain residence time in the back of the reactor.

Thus, it is no longer possible to have a reliable and representative image of the actual temperature of the coolant of the reactor core.

It is therefore necessary to replace these thermocouples and/or these pipes during scheduled upkeep operations of the nuclear reactor.

These pipes are replaced after the reactor has been stopped and cooled and after the cover has been disassembled.

The pipes are generally connected to each other by locking devices. These devices make it possible to lock the pipes in position relative to one another, so as to avoid any contact between the pipes. Such contacts may lead to piercing of the pipes.

The known locking devices are staples welded on the pipes. To replace the defective pipe, it is necessary to place the staples. This placement is a long and complex operation. It may destroy other pipes connected by the staples to the defective pipe.

SUMMARY OF THE INVENTION

In this context, an object of the invention is to provide an assembly making it possible to facilitate such a replacement operation.

To that end, the invention provides an assembly of the aforementioned type, characterized in that the locking device includes:
- at least one first arm;
- a locking axle having a plurality of bearing surfaces;
- a link connecting the locking axle to the first arm, the locking axle being movable relative to the first arm between a locking position, in which the segments of the tubes are each pinched between one of said bearing surfaces and the first arm, and a released position, in which the segments of the tubes are free relative to the first arm.

It is thus easy to free the tubes from one another, for example to replace one of the tubes. This operation does not destroy the tubes. The placement of the locking device is quick and easy, as is the release of the tubes.

The tubes are for example thermocouple pipes of a nuclear reactor. However, the tubes may be of any other type: fluid circulation tubes, electrical wire passage tubes, etc. The invention may apply to nuclear power plant tubes or tubes belonging to any other industrial facility.

The locking axle has any number of bearing surfaces: 2, 3, 4 or more than 4 bearing surfaces. All of the bearing surfaces are not necessarily used. The number of bearing surfaces used depends on the configuration of the tubes to be locked.

The tubes are generally not parallel to one another over their entire lengths. However, the tubes that are locked by the same locking device all extend in the same direction.

Each tube can have several segments locked in position by several locking devices, relative to the same set of tubes or different sets of tubes.

The fact that the segments of the tubes are each pinched between a bearing surface and the first arm here means that the bearing surface and the first arm exert pressure on the segment in two opposite directions. These pressures are applied to two zones of the segment opposite one another along the periphery of the segment. The pressures are sufficient to keep the tube in position relative to the locking axle and the first arm, despite stresses applied to the tube segment. In the case of nuclear reactor thermocouple pipes, the stresses result from temperature and pressure conditions within the vessel of the reactor, the circulation of the primary fluid in the vessel, etc. In any case, the pressures are computed to prevent the tubes from coming into contact with one another, at the segments engaged in the locking device or away from those segments.

Advantageously, the locking device comprises a second arm parallel to the first arm and connected to the first arm, and, in the locking position of the locking axle, the segments of a first set of tubes are pinched between the first arm and the locking axle, and the segments of a second set of tubes are pinched between the second arm and the locking axle.

It is thus possible to lock a larger number of tubes with the same locking device.

The first and second arms are typically parallel to one another, and have respective ends secured to one another by a wall. The locking axle extends between the first and second arms and is connected to the wall.

Alternatively, the locking device comprises a single arm.

Advantageously, the connection of the locking axle to the first arm is a pivot link around the pivot axis.

It is thus easy to move the locking axle between its locking position and its released position. For example, when the locking device includes two arms, moving the locking axle between its locking position and its released position corresponds to a rotation around the pivot axis by an angle comprised between 45° and 135°, preferably comprised between 70° and 110°, and for example equal to 90°.

The locking axle for example has first and second surfaces turned toward the first arm in the locking position and the released position, respectively. The first surface bears the bearing surfaces. Relative to the first arm, these bearing surfaces have a first separation substantially corresponding to the diameter of the tube segments. In the released position, zones of the second surface are situated along the tube segments. Relative to the first arm, these zones have a second separation larger than the first. Thus, in the released position, the tube segments are not pinched between the locking axle and the first arm and can be removed.

In one example embodiment, the locking axle has a rectangular section. The first surface corresponds to the small side of the rectangular section, and the second surface to the large side.

Alternatively, the bearing surfaces are depressions in the first surface, and said zones of the second surface are deeper depressions than the bearing surfaces. The locking axle then has a circular or square section.

Alternatively, the link connecting the locking axle to the first arm is not a pivot link. For example, the locking axle moves between its locking position and its released position by translation relative to the first arm.

Advantageously, the locking axle and the first arm have elongated shapes along the pivot axis, the locking axle extending along the pivot axis.

In other words, the locking axle pivots around itself. This arrangement is particularly convenient and compact.

Alternatively, the pivot axis is perpendicular to the first arm and the locking axle.

Advantageously, the locking axle comprises a deformable hollow sleeve defining the bearing surfaces and a lever engaged inside the sleeve, the lever being movable relative to the sleeve between a first position in which the bearing surfaces are in retracted positions relatively further from the first arm, and a second position in which the bearing surfaces are in protruding positions relatively closer to the arm.

The bearing surfaces go from their retracted position to their protruding position by deformation of the sleeve, under the effect of the movement of the lever.

Advantageously, at a first end, the locking axle has a relief provided to cooperate with a tool for rotating the locking axle.

This relief allows easy movement of the locking axle between its locking position and its released position. This relief can be a hollow or protruding cavity. For example, it has a hexagonal shape, or any other shape suitable for being rotated.

Advantageously, the bearing surfaces are depressions hollowed along the locking axle.

These depressions make it possible to wedge each tube along the locking axle. They have a depth allowing the tube not to slide outside the depression, in light of the pressure applied to the tube by the locking axle and the first arm. They are spaced apart from one another along the locking axle, preferably regularly spaced apart from one another. The spacing is chosen so that the tubes cannot touch one another under the effect of the stresses applied to them.

The depressions have a shape allowing the tube segments to be received, in the locking position, at the bottom of the depressions. For example, the depressions are each in the form of a slot, opening at both of its opposite ends. Considered in cross-section, the slot is defined by a bowed bottom. In the locking position, the slot is parallel to the tube segments.

Alternatively, the locking axle bears a plurality of protruding reliefs, the bearing surface being defined between two consecutive reliefs.

Advantageously, the locking axle is crimped on the first arm in the locking position.

Thus, the locking axle is locked relative to the first arm and cannot return to the released position. Furthermore, when the tube segment must be removed from the locking device, the crimping can be eliminated more easily than if the locking axle was welded to the first arm.

Typically, a segment of the locking axle outwardly bears a plurality of splines. The first arm bears a wall, in which an orifice is arranged that is crossed through by said segment of the locking axle. The wall bears a collar surrounding the cannulated segment. The crimping is obtained by folding the collar down on the splines.

Other anti-rotation locking systems could be used in place of crimping: a key, a folding washer or a set screw.

Advantageously, the first arm and the locking axle define a rectilinear aperture between them in which the tube segments are received, the first arm bearing a wall closing a first end of said aperture and defining a bearing for guiding the rotation of the locking axle.

Such an arrangement is particularly compact and convenient.

Advantageously, the first arm and the locking axle pinch the tube segments between then in a pinching direction, the locking device having, at a second end of the aperture opposite the first, a removable link connecting the locking axle to the first arm preventing a mutual separation between the locking axle and the first arm in the pinching direction in the locking position of the locking axle.

Thus, the separation between the locking axle and the first arm is limited, at the two ends of the aperture. The pinching force of the tube segments is guaranteed. The tubes therefore cannot move in the aperture.

The link is established in the locking position of the locking axle, but not in the released position.

For example, one of the locking axle and the first arm includes a tenon, engaged in a mortise arranged on the other of the locking axle and first arm when the locking axle is in the locked position. The tenon and the mortise do not cooperate in the released position.

Alternatively, the removable link is obtained by snapping the locking axle and the first arm to one another, or by any other means.

Advantageously, the removable link closes the aperture at its second end in the locking position of the locking axle and frees the second end in the released position of the locking axle.

Thus, the tube segments cannot leave the aperture in the locking position.

According to a second aspect, the invention provides a method for maintaining an assembly having the above features, the method comprising the following steps:
    placing the locking axle of the locking device in the released position;
    removing the locking device;
    performing maintenance on the defective tube;
    engaging the tube segments between the locking axle and the first arm of a locking device;
    placing the locking axle in the locking position.

The same locking device that was initially removed can be put back into place. However, another locking device can also be placed, of the same type as the original locking device, for example a new device.

BRIEF DESCRIPTION OF THE DRAWINGS

The invention will be better understood upon reading the following description, provided solely as an example and done in reference to the appended drawings, in which:

FIGS. 3 and 4 are perspective views of the assembly according to an embodiment of the invention, the locking axle of the locking device being shown in the released position and the locking position, respectively.

DETAILED DESCRIPTION

In the following description, the locking device will be described as it applies to locking several thermocouple pipes of a pressurized water nuclear reactor in position.

Figure 1:
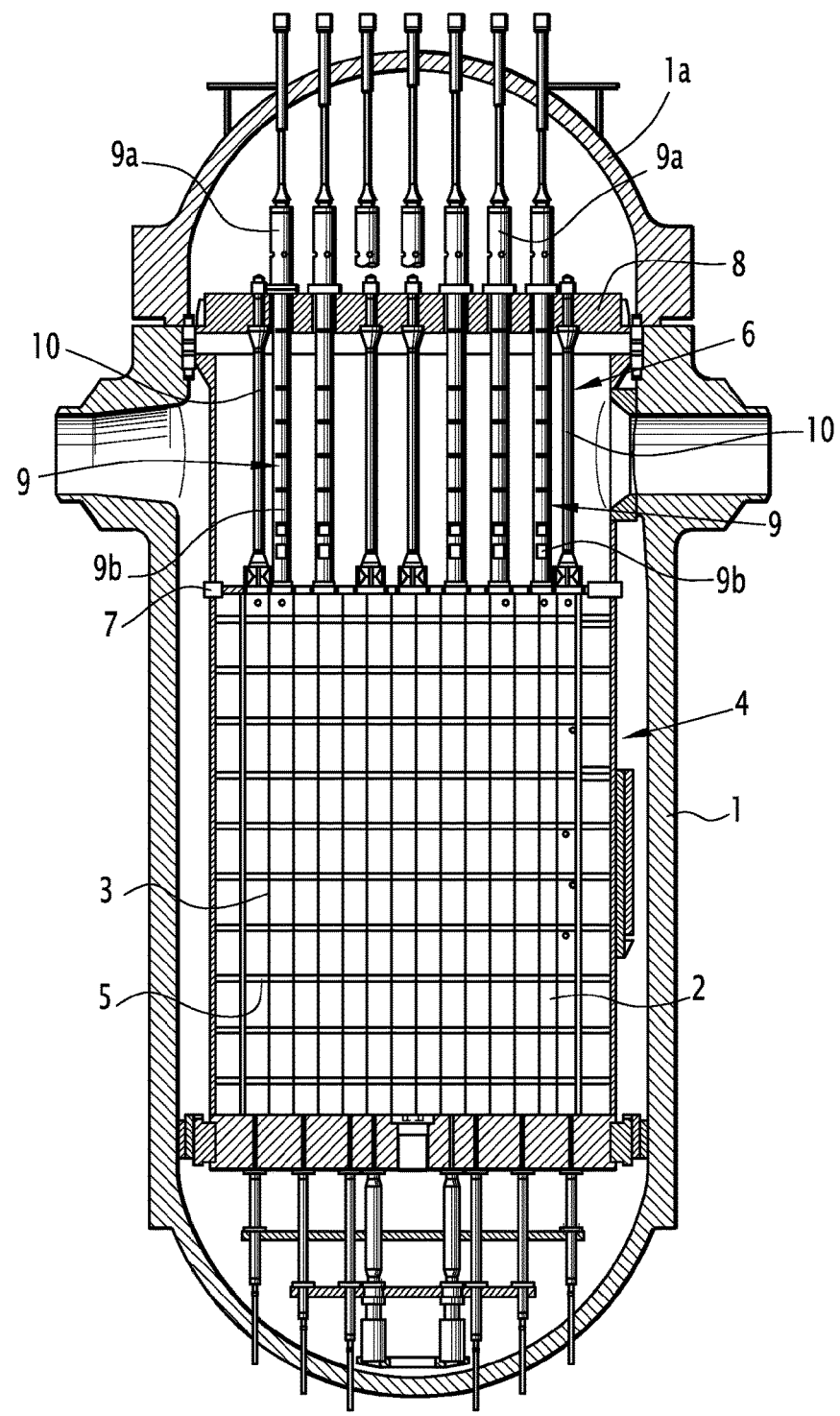
FIG. 1 is a diagrammatic sectional view through a vertical plane of symmetry of the vessel of a pressurized water nuclear reactor.

FIG. 1 diagrammatically shows a vessel of a pressurized water nuclear reactor, designated by reference 1. Traditionally, positioned inside the vessel 1 of the nuclear reactor is the core 2, made up of fuel assemblies 3 juxtaposed such that the longitudinal axis of the fuel assemblies is vertical. The core 2 of the reactor is positioned inside the lower inner equipment, designated by general reference 4, and which in particular includes the partition 5 of the core.

The nuclear reactor also comprises upper inner equipment, designated by general reference 6, which rests on the upper plate of the assemblies of the core, by means of an upper core plate 7.

As shown in FIG. 1, the upper inner equipment 6 includes a support plate 8 for guide tubes, which will be referred to hereinafter as the support plate 8. This support plate 8 extends parallel to the upper core plate 7 making up the lower part of the upper inner equipment 6 and that is made so as to fasten the upper inner equipment 6 to the inside of the vessel 1.

The upper inner equipment 6 includes guide tubes, designated by general reference 9, which are made up, each above the support plate 8, of an upper part 9a with a circular section, and, between the support plate 8 of the upper inner equipment 6 and the upper core plate 7, a lower part 9b generally with a substantially square section with rounded corners. Each of the parts 9a and 9b constitutes a guide tube 9 for the upper inner equipment 6 allowing the vertical movement of a cluster for adjusting the reactivity in the core of the nuclear reactor, connected to a suspension and movement rod, the vertical movement of which is done by a mechanism, not shown, situated above the cover 1a of the vessel 1.

In addition to the lower parts 9b of the guide tubes 9, spacer columns 10 seeing to the maintenance and separation of the upper core plate 7 and the support plate 8 are placed between the support plate 8 of the upper inner equipment 6 and the upper core plate 7.

Figure 2:
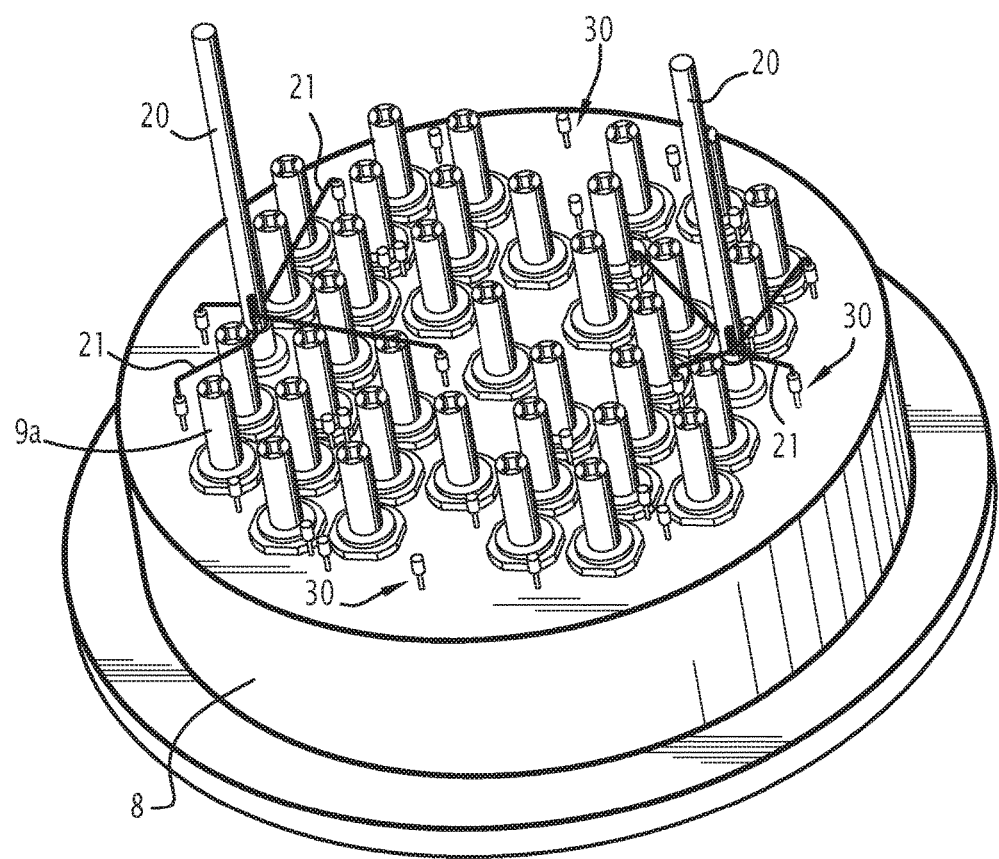
FIG. 2 is a diagrammatic and partial perspective view of the upper inner equipment of a nuclear reactor.

FIG. 2 diagrammatically shows a perspective view of the upper face of the support plate 8 that bears the upper parts 9a of the guide tubes 9 and in the example embodiment shown in this figure, two thermocouple columns 20 that extend parallel to the guide tubes 9, above the support plate 8. Traditionally, a set of upper guide pipes 21 is positioned in each of the thermocouple columns 20, each for a thermocouple (not shown) making it possible to measure the temperature of the coolant at the outlet of a preselected assembly set of the core of the nuclear reactor.

As shown in FIG. 2, several upper guide pipes 21 are positioned in a column 20 and leave that column through peripheral openings arranged above the base of the thermocouple column 20 so as each to join a branch designated by general reference 30 and intended for the passage of a thermocouple through the support plate 8.

In this figure, a limited quantity of the upper pipe 21 has been shown so as not to overload the figure. However, in reality, there are a large number of upper pipes 21, which must be kept in position relative to one another to avoid any interference between these pipes.

According to an embodiment of the invention, the pipes are kept in position by locking devices 40 of the type shown in FIGS. 3 and 4.

The device 40 is provided to lock a plurality of tubes in position having respective segments 42 substantially parallel to one another.

The device 40 comprises:
    at least one first arm 44;
    preferably a second arm 46;
    a locking axle 48 having a plurality of bearing surfaces 50;
    a link 52 connecting the locking axle 48 to the first arm 44.

In the illustrated example, the link 52 is a pivot link around a pivot axis X shown in the figures.

The first and second arms 44 and 46 are part of a U-shaped fork 54. They are connected to one another by a central wall 56. The wall 56 has an orifice 58 crossed through by the locking axle 48. The orifice 58 forms a guide bearing for the locking axle.

The first and second arms 44 and 46 are elongated parallel to the axis X. They are each in the form of a flat strip, defined by two large opposite faces 60 and 62. The large faces 60 of the first and second arms 44 and 46 are parallel to one another and turned toward one another. They are symmetrical to one another relative to the pivot axis X.

The wall 56 secures the respective first ends of the first and second arms 44 and 46 to one another. It is substantially perpendicular to the pivot axis X.

The second ends of the first and second arms 44 and 46, opposite the wall 56, are free. They are not directly connected to one another.

The locking axle 48 extends along the pivot axis X. It is engaged between the first and second arms 44 and 46. Two rectilinear apertures 63 are thus defined between the locking axle 48 and the first and second arms 44 and 46, in which the tube segments 42 are received. The wall 56 closes the first axial ends of the apertures 63.

Perpendicular to the pivot axis, the locking axle 48 has a rectangular section. It is thus defined by two first axial surfaces 64 parallel to and opposite one another, and two second axial surfaces 66 substantially perpendicular to the first axial surfaces 64. The first axial surfaces 64 define the small sides of the rectangular section. The second axial surfaces 66 define the large sides of the rectangular section.

The first axial surfaces 64 bear the bearing surfaces 50.

The bearing surfaces 50 are depressions hollowed along the first axial surfaces 64. They are regularly spaced axially apart from one another.

The depressions are slots hollowed in the first axial surfaces, elongated perpendicular to the pivot axis X. They each extend over the entire width of the first axial surface 64, and emerge at the two opposite ends.

Considered in cross-section, each depression has a bowed section.

The second axial surfaces 66 are planar and do not have depressions.

The locking axle 48 has an end segment 68 protruding relative to the wall 56, past the first and second arms 44 and 46. The segment 68 includes a hollow relief 70 provided to cooperate with a tool for rotating the locking axle. The hollow relief 70 is hollowed axially and emerges at an end surface of the locking axle substantially perpendicular to the axis X.

Furthermore, the end segment 68 outwardly bears splines 72, for crimping of the locking axle on the fork 54. To that end, the wall 56 bears, on a face turned opposite the arms 44 and 46, a collar 74 that surrounds the end part 68. The crimping is done by folding the collar 74 against the splines 72, such that the collar 74 is deformed and hugs the shape of the splines 72. Alternatively, the splines can be replaced by a thread.

In this case, the crimping is done by a screwing torque on the thread or by forced engagement of the collar on the thread.

The locking axle 48 bears a hammer 76 at its axial end opposite the segment 68. The hammer 76 includes two wings 78, diametrically opposite around the axis X, and extending radially from the locking axle 48. Each wing 78 includes a mortise 80.

The first and second arms 44 and 46 each have, at their free end 82 opposite the wall 56, a tenon 84, provided to cooperate with the mortise 80, as described below.

The locking axle 48 is rotatable around the axis X relative to the first and second arms 44 and 46, between a locking position, in which the segments 42 are each pinched between one of the bearing surfaces 50 of the first or second arms 44 or 46, and a released position, in which the segments 42 are free relative to the first and second arms 44, 46. The released position is shown in FIG. 3, and the locked position is shown in FIG. 4.

In the released position, the second surfaces 66 are turned toward the large faces 60 of the first and second arms 44 and 46. The wings 78 are oriented parallel to the large faces 60. The apertures 63 are therefore not closed off at their ends opposite the wall 56. The mortises 80 are not engaged with the tenons 84. It is therefore possible to insert the segments 42 in the apertures 63 through the openings of those apertures.

In the locking position, the first surfaces 64 are turned toward the large faces 60 of the first and second arms 44 and 46. The wings 78 are oriented perpendicular to the large faces 60. The wings 78 close off the apertures 63 at the ends opposite the wall 56. The bearing surfaces 50 are oriented substantially parallel to the segments 42. Each segment 42 bears on one side against the bottom of a bearing surface, over the entire width of the bearing surface. It bears on the opposite side against the large face 60 of the first or second arms 44, 46, over the entire width of the large face. Each segment 42 is thus pinched in a pinching direction substantially perpendicular to the pivot axis X, between the bearing surface 50 and the large face 60. The mortises 80 are engaged with the tenons 84. The tenons and mortises cooperate to prevent the first and second arms from moving away from the locking axle 48 in the pinching direction.

The maintenance method for pipes locked in position by a locking device 40 of the type described above will now be outlined.

Consider a starting situation in which the locking axle 48 is in the locking position, and is crimped on the fork 54.

The collar 74 is first eliminated, so as to interrupt the crimping and release the locking axle 48. It is for example cut by milling.

In the event the splines are replaced by a thread, the collar is then crimped by exerting an unscrewing torque. It can be reused for several crimping/uncrimping operations on the thread.

The method next comprises the following steps:
  placing the locking axle 48 of the locking device 40 in the released position;
  removing the locking device 40;
  performing the maintenance on the defective pipe;
  engaging the segments 42 of the pipe between the locking axle 48 of the first and second arms 46, 48 of a new locking device 40;
  placing the locking axle 48 of the new locking device 40 in the locking position.

The locking axle 48 is moved toward its released position using a tool such as a key (not shown), engaged in the cavity 70. The key is engaged and turned by an operator.

Then, the locking device 40 is pulled axially, so as to remove the segments 42 from the apertures 63. It is next possible to replace or repair the defective pipe.

A new locking device 40 is next placed. Its locking axle is initially in the released position. It is moved axially so as to cause the segments 42 to penetrate the apertures 63. The locking axle 48 is then moved toward its locking position using a tool such as a key (not shown), engaged in the cavity 70. The key is engaged and turned by an operator.

The segments 42 are then pinched and are locked in position relative to one another.

Another embodiment of the invention will now be described, in reference to FIG. 5. Only the differences between the embodiment of FIG. 5 and that of FIGS. 3 and 4 will be outlined below. Identical elements or elements performing the same function will be designated using the same references.

Figure 5:
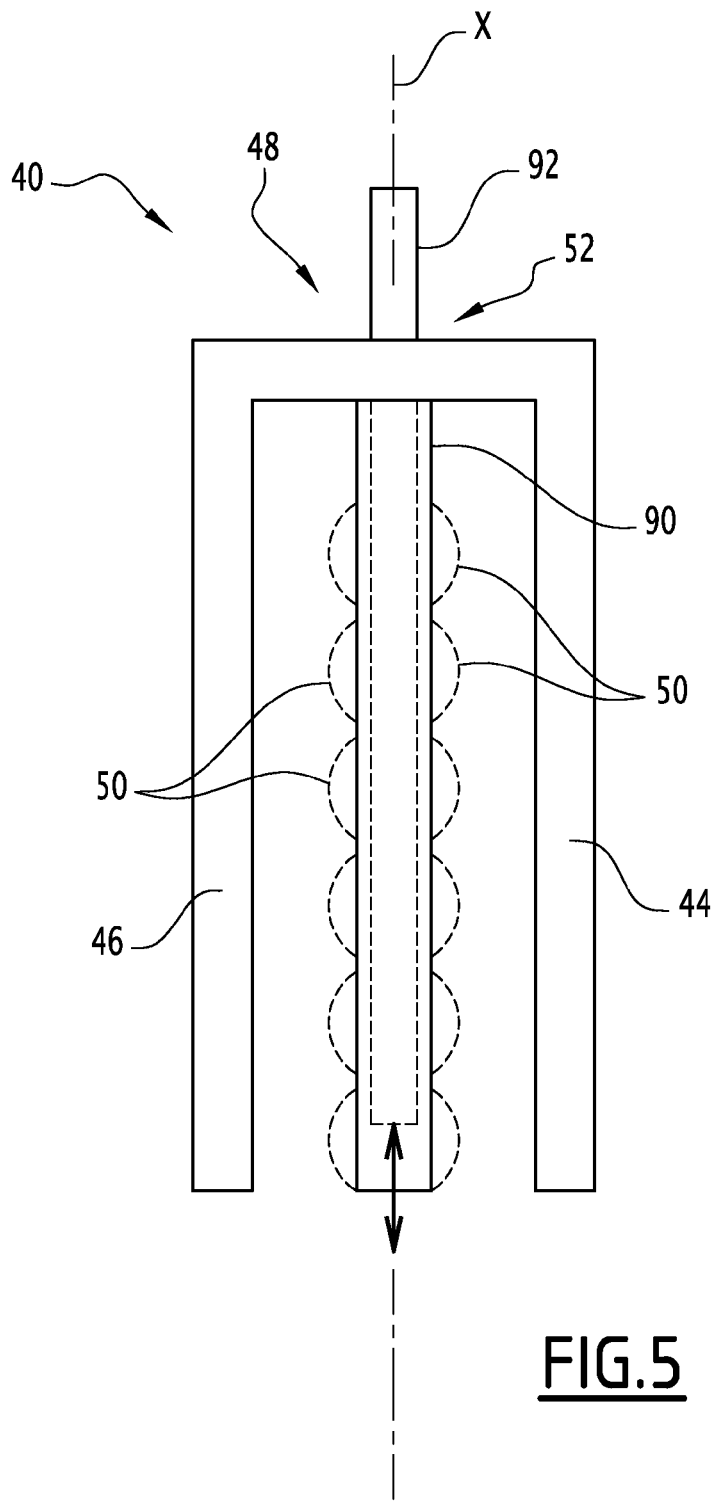
FIG. 5 is a simplified elevation view of another embodiment of the assembly according to the invention.

In FIG. 5, the locking axle 48 includes a deformable sleeve 90 and a sliding lever 92 engaged in said sleeve 90. The sleeve 90 is hollow, and extends along the axis X. The bearing surfaces 50 are formed on the sleeve 90. The sleeve 90 is rigidly fixed to the arms 44 and 46.

The lever 92 also extends along the axis X, and is movable axially relative to the sleeve 90 and the arms 44, 46 between a first position, in which the bearing surfaces 50 are retracted, and a second position, in which the bearing surfaces 50 are protruding.

The retracted positions of the bearing surfaces 50 are shown in solid lines in FIG. 5, and the protruding positions are shown in broken lines. In their retracted positions, the bearing surfaces 50 are relatively further from the arms 44 and 46. In their protruding positions, the bearing surfaces 50 are relatively closer to the arms 44 and 46. For example, the sleeve 90 has, in the retracted position of the bearing surfaces 50, a tubular shape, with a circular, square or rectangular base. In the protruding position, the bearing surfaces 50 protrude relative to said tubular shape, toward the arms 44 and 46.

The bearing surfaces go from their retracted position to their protruding position by deformation of the sleeve 90, under the effect of the movement of the lever 92. The deformation is an elastic deformation. The locking axle 48 is therefore in its locking position when the bearing surfaces 50 are in their protruding positions, said bearing surfaces 50 then pinching the segments 42 of the tubes against the arms 44 and 46. The locking axle 48 is in its released position when the bearing surfaces 50 are in their retracted positions, the tubes then being free relative to the arms 44 and 46.

The invention claimed is:
1. An assembly comprising:
    a plurality of tubes having respective segments parallel to one another;
    a locking device for locking the tubes in position relative to one another, the device including:
        at least one first arm;
        a locking axle having a plurality of bearing surfaces; and
        a link connecting the locking axle to the first arm, the locking axle being movable relative to the first arm between a locking position, in which the segments of the tubes are each pinched between one of said bearing surfaces and the first arm, and a released position, in which the segments of the tubes are free relative to the first arm,
        the bearing surfaces being depressions hollowed along the locking axle.
2. The assembly as recited in claim 1 wherein the locking device comprises a second arm parallel to the first arm and connected to the first arm, and, in the locking position of the locking axle, the segments of a first set of the tubes are pinched between the first arm and the locking axle, and the segments of a second set of the tubes are pinched between the second arm and the locking axle.

3. The assembly as recited in claim 1 wherein the link of the locking axle to the first arm is a pivot link around a pivot axis.
4. The assembly as recited in claim 3 wherein the locking axle and the first arm have elongated shapes along the pivot axis, the locking axle extending along the pivot axis.
5. The assembly as recited in claim 1 wherein the locking axle comprises a deformable hollow sleeve defining the bearing surfaces and a lever engaged inside the sleeve, the lever being movable relative to the sleeve between a first position in which the bearing surfaces are in retracted positions relatively further from the first arm, and a second position in which the bearing surfaces are in protruding positions relatively closer to the first arm.
6. The assembly as recited in claim 1 wherein at a first end, the locking axle has a relief provided to cooperate with a tool for rotating the locking axle.
7. The assembly as recited in claim 1 wherein the locking axle is crimped on the first arm in the locking position.
8. The assembly as recited in claim 1 wherein the first arm and the locking axle define a rectilinear aperture therebetween in which the tube segments are received, the first arm bearing a wall closing a first end of said aperture and defining a bearing for guiding the rotation of the locking axle.
9. The assembly as recited in claim 8 wherein the first arm and the locking axle pinch the tube segments positioned therebetween in a pinching direction, the locking device having, at a second end of the aperture opposite the first, a removable link connecting the locking axle to the first arm preventing a mutual separation between the locking axle and the first arm in the pinching direction in the locking position of the locking axle.
10. The assembly as recited in claim 9 wherein the removable link closes the aperture at a second end thereof in the locking position of the locking axle and frees the second end in the released position of the locking axle.
11. The assembly as recited in claim 1 wherein the tubes are thermocouple pipes of a nuclear reactor.
12. A maintenance method for the assembly as recited in claim 1, the method comprising:
    placing the locking axle of the locking device in the released position;
    removing the locking device;
    performing maintenance on the defective tube;
    engaging the tube segments between the locking axle and the first arm of the locking device; and
    placing the locking axle in the locking position.
13. An assembly comprising:
    a plurality of tubes having respective segments parallel to one another;
    a locking device for locking the tubes in position relative to one another, the locking device including:
        at least one first arm;
        a locking axle having a plurality of bearing surfaces; and
        a link connecting the locking axle to the first arm, the locking axle being movable relative to the first arm between a locking position, in which the segments of the tubes are each pinched between one of said bearing surfaces and the first arm, and a released position, in which the segments of the tubes are free relative to the first arm;
        the first arm and the locking axle defining a rectilinear aperture between them in which the tube segments are received, the first arm bearing a wall closing a first end of said aperture and defining a bearing for guiding the rotation of the locking axle;

the first arm and the locking axle pinching the tube segments between the first arm and the locking axle in a pinching direction, the locking device having, at a second end of the aperture opposite the first, a removable link connecting the locking axle to the first arm preventing a mutual separation between the locking axle and the first arm in the pinching direction in the locking position of the locking axle.

14. The assembly as recited in claim 13 wherein the removable link closes the aperture at a second end thereof in the locking position of the locking axle and frees the second end in the released position of the locking axle.

* * * * *